(12) United States Patent
Kameoka

(10) Patent No.: US 7,988,121 B2
(45) Date of Patent: Aug. 2, 2011

(54) WALL HANGER

(75) Inventor: Shinichi Kameoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 662 days.

(21) Appl. No.: 12/112,234

(22) Filed: Apr. 30, 2008

(65) Prior Publication Data

US 2008/0277548 A1    Nov. 13, 2008

(30) Foreign Application Priority Data

May 8, 2007  (JP) .................................. 2007-123257

(51) Int. Cl.
  *A47G 1/24*  (2006.01)
(52) U.S. Cl. .......................... 248/476; 248/317; 248/496
(58) Field of Classification Search ............. 248/222.14, 248/476, 489, 496, 497, 317, 322, 339
  See application file for complete search history.

(56) References Cited

U.S. PATENT DOCUMENTS

| | | | | |
|---|---|---|---|---|
| 2,898,064 A | * | 8/1959 | Scott ............................. | 248/496 |
| 2,965,339 A | * | 12/1960 | Denton ......................... | 248/495 |
| 3,254,438 A | * | 6/1966 | Filary et al. ................... | 248/467 |
| 3,838,842 A | * | 10/1974 | McCracken .................. | 248/476 |
| 3,952,436 A | * | 4/1976 | Kuhnke .......................... | 40/757 |
| 6,241,210 B1 | * | 6/2001 | Brindisi ......................... | 248/476 |
| 2007/0046837 A1 | | 3/2007 | Elberbaum | |

FOREIGN PATENT DOCUMENTS

| | | |
|---|---|---|
| EP | 1 777 954 A | 4/2007 |
| JP | 11-294436 A | 10/1999 |

* cited by examiner

*Primary Examiner* — Tan Le
(74) *Attorney, Agent, or Firm* — Global IP Counselors

(57) ABSTRACT

A wall hanger for hanging a display device on a wall includes a latching member, an outer hanger member, an inner hanger member and a screw. The inner hanger member includes a threaded portion with a threaded hole and a lock portion with a lock hole. The lock portion is integrally formed with the threaded portion and bent to face the threaded portion with a predetermined space therebetween so that the threaded hole and the lock hole are concentrically positioned. The screw has a predetermined length so that the inner and outer hanger members sandwich a rear cover of the display device when the rear cover of the display device is disposed therebetween. The lock hole prevents a long screw from being threaded into the display device by mating an inner peripheral face of the lock hole with a distal end of the long screw.

8 Claims, 4 Drawing Sheets

WALL HANGER

CROSS-REFERENCE TO RELATED APPLICATIONS

This application claims priority to Japanese Patent Application No. 2007-123257 filed on May 8, 2007. The entire disclosure of Japanese Patent Application No. 2007-123257 is hereby incorporated herein by reference.

BACKGROUND OF THE INVENTION

1. Field of the Invention

The present invention generally relates to a wall hanger. More specifically, the present invention relates to a wall hanger for hanging a display device on a wall.

2. Background Information

A conventional flat panel display is hung on a wall with a wall hanger. The wall hanger has inner and outer wall hanger fittings and a latching piece. The inner and outer wall hanger fittings sandwich a rear cover of the flat panel display. The latching piece is affixed to the wall. A display screen for showing video is formed on a front side of the flat panel display.

The inner wall hanger fitting is a piece of sheet metal formed in an approximate H shape when viewed from the front. A pair of left and right L-shaped hooks is formed on the rear cover. The left and right hooks are engaged in a pair of left and right engagement holes formed in a vertical center of the inner wall hanger fitting. The inner wall hanger fitting is affixed to an inner face of the rear cover at two places at upper ends with fasteners.

Bottomed cylindrical components are formed by drawing at four corners of the inner wall hanger fitting. A screw hole is formed in an inner face of each of the bottomed cylindrical components.

The outer wall hanger fitting is formed in substantially the same shape as the inner wall hanger fitting. A substantially L-shaped latching tab extends integrally from a rear face of the outer wall hanger fitting. The outer wall hanger fitting is placed against an outer face of the rear cover. Standard screws are passed through holes formed in the outer wall hanger fitting and the rear cover, and then threaded with a torque wrench or other such tightening tool into the screw holes. As a result, the inner and outer wall hanger fittings are integrally linked with the rear cover sandwiched in between.

The wall hanging procedure will now be described. The flat panel display is grasped and the latching tab is inserted into a pocket of the latching piece to latch the flat panel display to the wall.

With the conventional wall hanger, even if a long screw that is longer than the standard screw is inadvertently threaded in, a distal end of the long screw will hit a bottom face of the bottomed cylindrical component and cannot be threaded any farther. Thus, the user will immediately realize the error. This prevents electronic parts and so forth from being damaged, short-circuited, etc., which could otherwise be caused by contact with the electronic parts if the long screw went deeply inside the rear cover.

Nevertheless, an expensive drawn piece has to be used to form each of the bottomed cylindrical components, and drawing with a mold entails numerous steps and takes considerable time. Furthermore, precise machining is necessary to form the screw holes in the inner faces of the bottomed cylindrical components, which drives up production costs.

Another conventional wall hanger includes a housing and a main body (see Japanese Laid-Open Patent Application Publication H11-294436, for example). The main body is fixed to the housing. Screw holes are formed in the housing. Screw holes having a different pitch from that of the screw holes of the housing are formed in the main body. If long screws are inadvertently threaded into the screw holes of the housing, then distal ends of the long screws will be threaded into the screw holes of the main body. However, since the screw holes of the main body have different pitches from that of the screw holes of the housing, the long screws are prevented from being threaded in.

With the conventional wall hanger, the main body formed separately from the housing is used in addition to the housing. Thus, more parts are required, and fixing the housing to the main body also takes time and effort. Furthermore, the screw holes having a different pitch from that of the screw holes of the housing have to be formed in the main body. Since making the holes also takes time and effort, the structure is complicated and expensive to produce.

In view of the above, it will be apparent to those skilled in the art from this disclosure that there exists a need for an improved connecting structure. This invention addresses this need in the art as well as other needs, which will become apparent to those skilled in the art from this disclosure.

SUMMARY OF THE INVENTION

The present invention was conceived in light of the above-mentioned problems. One object of the invention is to provide a wall hanger which prevents inappropriate screws from being deeply threaded in.

In accordance with one aspect of the present invention, a wall hanger for hanging a display device on a wall includes a latching member, an outer hanger member, an inner hanger member and a screw. The latching member is configured to be attached to the wall. The outer hanger member is configured to be fixedly coupled to a rear side of a rear cover of the display device and latched to the latching member. The outer hanger member has a first through hole arranged to align with a second through hole of the rear cover. The inner hanger member is configured to be fixedly coupled to a front side of the rear cover of the display device. The inner hanger member includes a threaded portion with a threaded hole and a lock portion with a lock hole. The lock portion is integrally formed with the threaded portion and bent to face the threaded portion with a predetermined space therebetween so that the threaded hole and the lock hole are concentrically positioned. The screw has a predetermined length so that the inner and outer hanger members sandwich the rear cover of the display device when the rear cover of the display device is disposed therebetween. The screw is inserted through the first through hole of the outer hanger member and the second through hole of the rear cover and threaded into the threaded hole of the inner hanger to fixedly couple the rear cover between the inner and outer hanger members. The lock hole prevents a long screw longer than the predetermined length from being threaded into the display device by mating an inner peripheral face of the lock hole with a distal end of the long screw.

With the wall hanger of the present invention, it is possible to provide a wall hanger which prevents inappropriate screws from being deeply threaded in.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5C is a partial cross sectional view of the wall hanger illustrating how the standard screw is threaded in;

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention are provided for illustration only and not for the purpose of limiting the invention as defined by the appended claims and their equivalents.

Figure 6A:
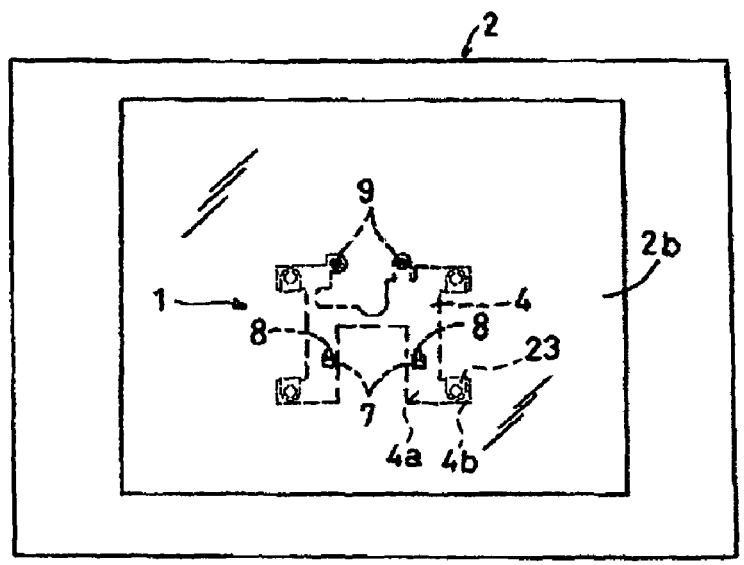
FIG. 6A is a front elevational view of a display device having the wall hanger illustrated in FIG. 1A.
Figure 6B:
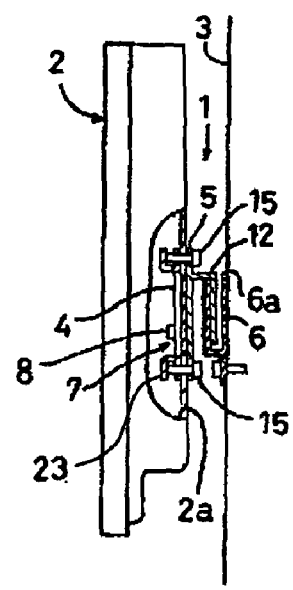
FIG. 6B is a side elevational view of the display device illustrated in FIG. 6A with a portion broken away to reveal the wall hanger.

FIGS. 6A and 6B illustrate how a flat panel display (e.g., display device) 2 is hung on a wall 3 with a wall hanger 1. The flat panel display 2 is a display device such as a liquid crystal television set, a liquid crystal monitor or another such flat panel display. The flat panel display 2 includes a rear cover 2a and a display screen 2b. The rear cover 2a has a pair of left and right L-shaped hooks 8 protruding forward and upward. The display screen 2b is formed on a front side of the flat panel display 2 to show video.

Referring to FIGS. 1A through 4, 6A and 6B, the wall hanger 1 has inner and outer wall hanger fittings (e.g., inner and outer hanger member) 4 and 5 and a latching piece (e.g., latching member) 6. The inner and outer hanger fittings 4 and 5 sandwich the rear cover 2a of the flat panel display 2. The rear cover 2a has four through holes (e.g., second through holes) 13. The outer wall hanger fitting 5 has four through holes (e.g., first through holes) 14. The inner wall hanger fitting 4 has four screw holes (e.g., threaded holes) 11. The inner and outer hanger fittings 4 and 5 and the rear cover 2a are fixed with a plurality of standard screws 15 having a predetermined length. Specifically, each of the standard screws 15 is inserted into each of the through holes 13 and each of the through holes 14, and then threaded into each of the screw holes 11. Washers 16 are placed between heads of the standard screws 15 and the outer wall hanger fitting 5. The latching piece 6 is affixed to the wall 3. The latching piece 6 has a pocket 6a to latch the outer wall hanger fitting 5.

The inner wall hanger fitting 4 is a piece of sheet metal formed in an approximate H shape in a front view. The inner wall hanger fitting 4 has a main body 4a and extension portions (e.g., threaded portion) 4b. The main body 4a is formed in an approximate H shape in the front view. The extension portions 4b are formed at four outer corners of the main body 4a. The extension portions 4b laterally outwardly protrude from the four outer corners. Each of the extension portions 4b has the screw hole 11 and a tongue (e.g., lock portion) 23. The screw hole 11 is formed in a through hole.

Figure 1A:
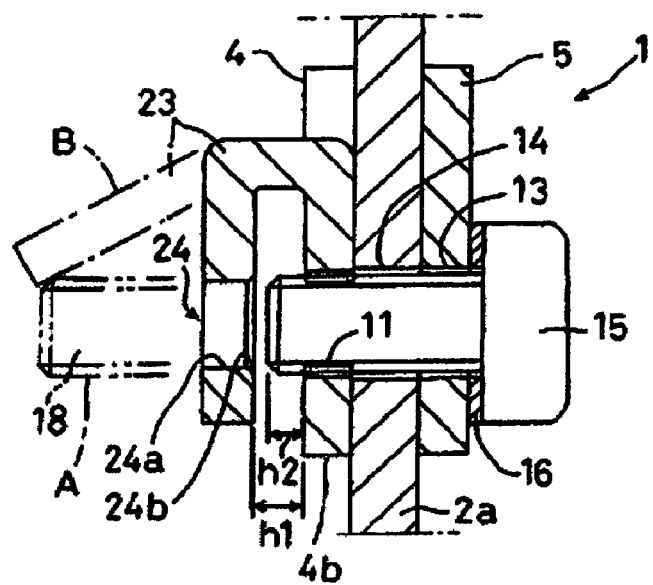
FIG. 1A is a partial cross sectional view of a wall hanger in accordance with one embodiment of the present invention.
Figure 1B:
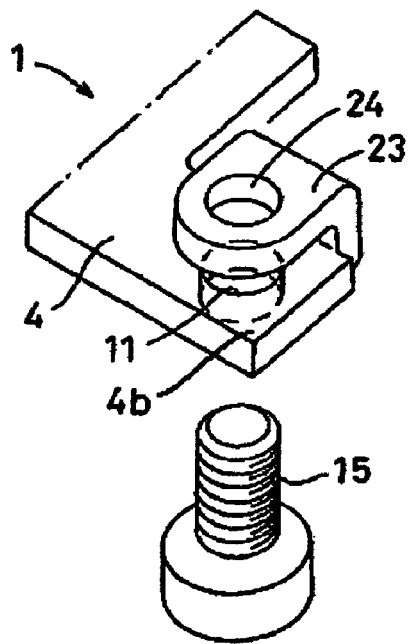
FIG. 1B is an exploded perspective view of the wall hanger illustrated in FIG. 1A.
Figure 2:
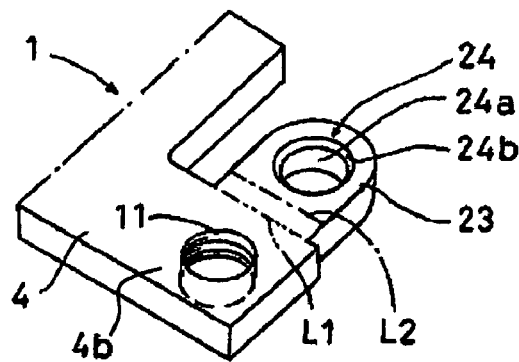
FIG. 2 is a perspective view of the wall hanger illustrated in FIG. 1A shown in an intermediate manufacturing condition.

The tongue 23 integrally extends from each of the extension portions 4b of the inner wall hanger fitting 4 in proximity to each of the screw holes 11. Each of the tongue 23 has a lock hole 24 formed in a distal end of each of the tongues 23. As indicated by the imaginary lines L1 and L2 in FIG. 2, each of the tongues 23 is bent at two places to form a U shape in a side view. As a result, as shown in FIG. 1A, the distal ends of the tongues 23 are located opposite the screw holes 11 with a specific spacing h1 between the tongues 23 and the extension portions 4b. Furthermore, the lock holes 24 are positioned concentrically with the screw holes 11.

Figures 3A, 3B:
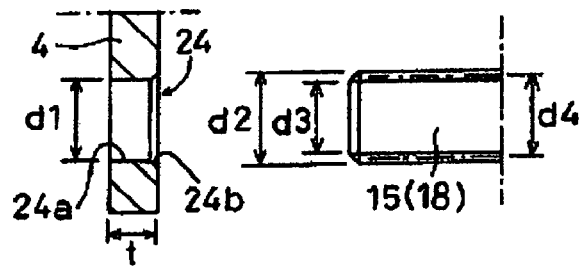
FIG. 3A is a partial cross sectional view illustrating a lock hole of the wall hanger.
FIG. 3B is a partial side view of a distal end of a screw.

As shown in FIG. 1A, the spacing h1 between each of the tongues 23 and each of the extension portions 4b is set to be greater than a length h2 between each of the extension portions 4b and a distal end of each of the standard screws 15 that is threaded into each of the screw holes 11 and protrudes from each of the extension portions 4b of the inner wall hanger fitting 4 (h1>h2). Furthermore, as shown in FIGS. 3A and 3B, an inside diameter d1 of each of the lock holes 24 is set to be smaller than an major diameter d2 of each of the standard screws 15, but larger than a minor diameter (e.g., root diameter) d3 of each of the standard screws 15. Moreover, as shown in FIG. 3A, an inner peripheral edge of each of the lock holes 24, which faces each of the screw holes 11 of the extension portions 4b, is chamfered to form a tapered face 24b.

The main body 4a includes a pair of left and right engagement holes 7. The left and right engagement holes 7 are formed in a vertical center of the main body 4a of the inner wall hanger fitting 4. The left and right L-shaped hooks 8 of the rear cover 2a are engaged in the left and right engagement holes 7 to position and hold the inner wall hanger fitting 4. The inner wall hanger fitting 4 is affixed to an inner face (front side) of the rear cover 2a at two places at upper ends with fasteners 9.

The outer wall hanger fitting 5 is formed in substantially the same shape as the inner wall hanger fitting 4. A substantially L-shaped latching tab 12 extends integrally from a rear face of the outer wall hanger fitting 5. The outer wall hanger fitting 5 is placed against an outer face (rear side) of the rear cover 2a. The standard screws 15 are inserted into the through holes 13 and 14, and then threaded with a torque wrench or other such tightening tool into the screw holes 11. As a result, the inner and outer wall hanger fittings 4 and 5 are integrally linked with the rear cover 2a sandwiched therebetween.

The wall hanging procedure will now be described. As shown in FIG. 6B, the flat panel display 2 is grasped and the latching tab 12 of the outer wall hanger fitting is inserted into the pocket 6a of the latching piece 6 to latch the flat panel display 2 to the wall 3.

With the wall hanger 1, the spacing h1 between the inner wall hanger fitting 4 and the distal end of the tongues 23 is set to be greater than the length h2 between each of the extension portions 4b and a distal end of each of the standard screws 15 that is threaded into each of the screw holes 11 and protrudes from each of the extension portions 4b of the inner wall hanger fitting 4 (h1>h2). Thus, the tongues 23 do not interfere with the standard screws 15. Therefore, the standard screws can be reliably threaded all the way into the screw holes 11.

Figure 4:
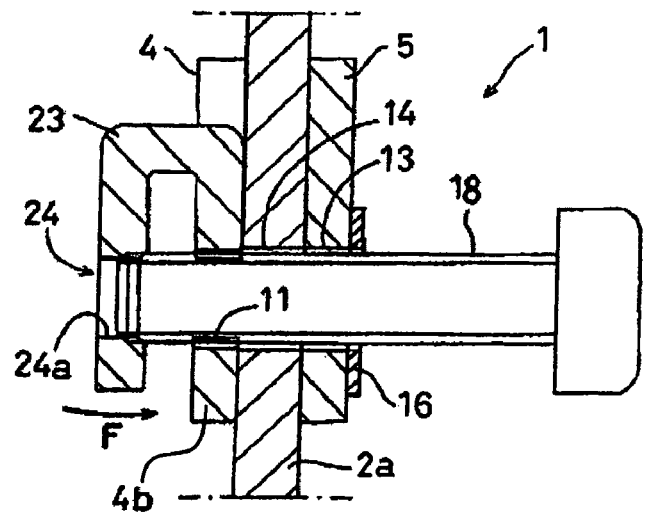
FIG. 4 is a partial cross sectional view of the wall hanger illustrated in FIG. 1A.

As shown in FIG. 4, if a long screw 18 having longer length than the standard screw 15 is inadvertently inserted the through holes 13 and 14, and then threaded into the screw hole 11, then a distal end of the long screw 18 will bite into the inner peripheral face of the lock hole 24 formed in the tongue 23. In other words, the lock hole 24 prevents the long screw 18 from being threaded into the flat panel display 2 by mating the inner peripheral face of the lock hole 24 with the distal end of the long screw 18. This prevents electronic parts and so forth from being damaged, short-circuited, etc., by contacting with the electronic parts when the long screw 18 is inserted deeply inside the rear cover 2a.

The tongues 23 are integrally extended from the inner wall hanger fitting 4 as a one-piece, unitary member. Thus, there is no increase in the number of required parts. Furthermore, the lock holes 24 are merely formed in the distal ends of the tongues 23. Thus, there is no need to form threaded holes having a different pitch from that of the screw holes 11. Therefore, the structure becomes simple and production costs become lower.

If the inside diameter d1 of the lock holes 24 is greater than the outside diameter d2 of the standard screws 15, then there is the risk that the distal end of the long screw 18 that has been inadvertently threaded in will pass through the lock hole 24, contact with an electronic part or the like inside the rear cover 2a, and short out the part.

Furthermore, if the inside diameter d1 of the lock holes 24 is smaller than the minor diameter d3 of the standard screws 15, then, as indicated by the one-dot chain line B in FIG. 1A, there is the risk that the tongue 23 is pushed and bent by the distal end of the long screw 18 that has inadvertently been threaded in, and that the distal end of the long screw 18 is inserted deeply into the rear cover 2a and contacts with an electronic part or the like, or short out the part.

However, with the wall hanger 1, the inside diameter d1 of each of the lock holes 24 is set to be smaller than the outside diameter d2 of each of the standard screws 15, but larger than the minor diameter d3 of each of the standard screws 15. Thus, as shown in FIG. 4, the distal end of the long screw 18 will reliably bite into the inner peripheral face 24a of the lock hole 24. Therefore, the long screw 18 cannot be threaded in any farther.

Specifically, if the standard screws 15 are M4 male thread screws having a JIS-standard metric coarse screw thread, then the outside diameter d2 is 4.000 mm, the minor diameter d3 is 3.242 mm, and the effective diameter d4 is 3.545 mm, while the inside diameter d1 of the lock holes 24 is set to between 4.000 and 3.242 mm (preferably, 3.500 mm, which is close to the effective diameter d4). Also, the thickness t of the inner wall hanger fitting 4 is preferably set to 1.6 mm.

Since the inner peripheral edge of each of the lock holes 24 is chamfered to form the tapered face 24b, the distal end of the inadvertently threaded long screw 18 is guided into the lock hole 24 by the tapered face 24b. Thus, the distal end of the long screw 18 can be more reliably made to bite into the inner peripheral face 24a of the lock hole 24.

Figures 5A, 5B:
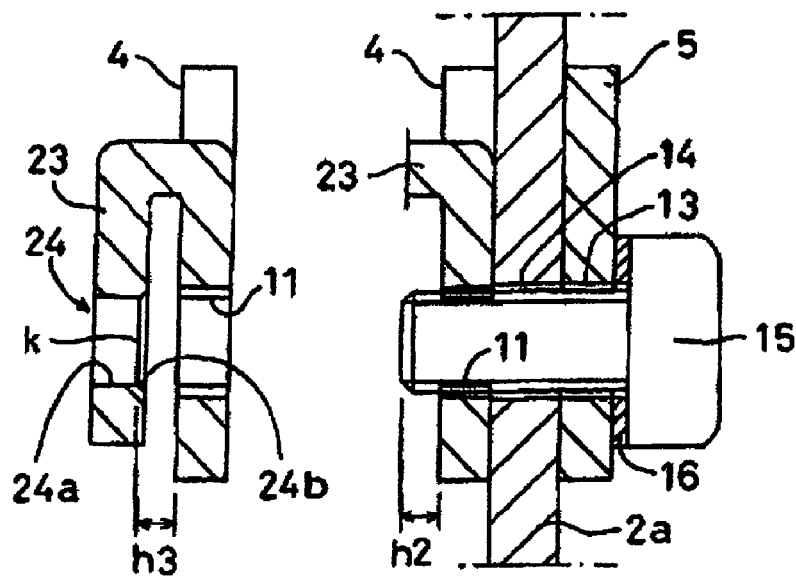
FIG. 5A is a partial cross sectional view of an inner wall hanger fitting of a wall hanger in accordance with a variation the present invention.
FIG. 5B is a partial cross sectional view of the wall hanger illustrating how a standard screw protrudes.
Figure 5C:
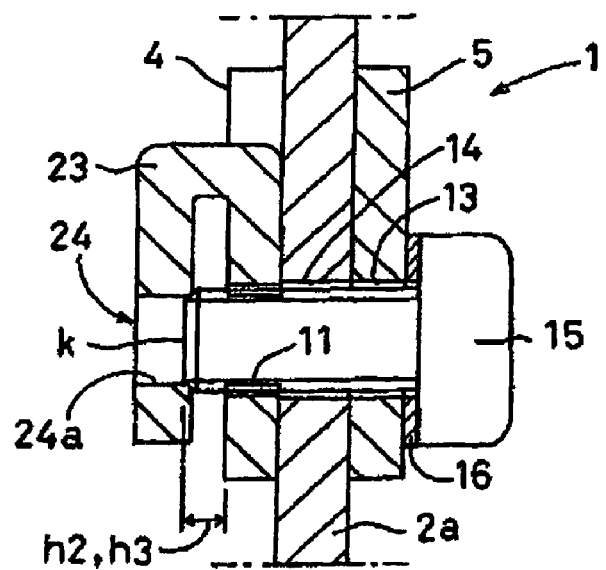

As shown in FIGS. 5A through 5C, a spacing h3 between each of the extension portions 4b and an interface line k between the tapered face 24b and the inner peripheral face 24a of the lock hole 24 can be set to be the same as or slightly less than the length h2 between each of the extension portions 4b and the distal end of each of the standard screws 15 that is threaded into the screw hole 11 and protrudes from the inner wall hanger fitting 4 (h3≦h2).

As shown in FIG. 5C, when the standard screw 15 is threaded into the screw hole 11, the distal end of the standard screw 15 hits the tapered face 24b. In other words, the distal end of the standard screw 15 can receive a pushing force from the tongue 23, which keeps the standard screw 15 from unthreading.

In this case, the tongues 23 have two functions, namely, a function of preventing of standard screws 15 from unthreading, and a function of preventing the threading of the long screw 18. Thus, the wall hanger 1 can be conveniently used.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a flat panel display equipped with the present invention. Accordingly, these terms, as utilized to describe the present invention should be interpreted relative to a flat panel display equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A wall hanger for hanging a display device on a wall, comprising:
    a latching member configured to be attached to the wall;
    an outer hanger member configured to be fixedly coupled to a rear side of a rear cover of the display device and latched to the latching member, the outer hanger member having a first through hole arranged to align with a second through hole of the rear cover;
    an inner hanger member configured to be fixedly coupled to a front side of the rear cover of the display device, the inner hanger member including a threaded portion that has an end face with a threaded hole and a lock portion that has an end face with a lock hole, the lock portion being integrally formed with the threaded portion as a one-piece, unitary member, the end face of the threaded portion and the end face of the lock portion facing each other in an axial direction of the threaded hole of the threaded portion such that the threaded hole and the lock hole are concentrically positioned, the end face of the threaded portion being spaced from the end face of the lock portion in the axial direction of the threaded hole of the threaded portion with a predetermined spacing therebetween; and
    a screw having a predetermined length so that the inner and outer hanger members sandwich the rear cover of the display device when the rear cover of the display device is disposed therebetween,
    the screw being inserted through the first through hole of the outer hanger member and the second through hole of the rear cover and threaded into the threaded hole of the inner hanger to fixedly couple the rear cover between the inner and outer hanger members, and the lock hole preventing a long screw longer than the predetermined length from being threaded into the display device by mating an inner peripheral face of the lock hole with a distal end of the long screw.

2. The wall hanger according to claim 1, wherein an inside diameter of the lock hole is smaller than a major diameter of the screw, but larger than a minor diameter of the screw.

3. The wall hanger according to claim 1, wherein a rear edge of the inner peripheral face of the lock hole is chamfered to form a tapered face.

4. The wall hanger according to claim 2, wherein a rear edge of the inner peripheral face of the lock hole is chamfered to form a tapered face.

5. The wall hanger according to claim 3, wherein a spacing from the inner hanger member to an interface line between the tapered face and the inner peripheral face has a length such that a distal end of the screw that is threaded into the threaded hole abuts the tapered face of the lock hole.

6. A wall hanger for hanging a display device on a wall, the wall hanger comprising:

a latching member configured to be attached to the wall;

an outer hanger member configured to be fixedly coupled to a rear side of a rear cover of the display device and latched to the latching member, the outer hanger member having a first through hole arranged to align with a second through hole of the rear cover;

an inner hanger member configured to be fixedly coupled to a front side of the rear cover of the display device, the inner hanger member including a threaded portion with a threaded hole and a lock portion with a lock hole, the lock portion being integrally formed with the threaded portion and bent to face the threaded portion with a predetermined space therebetween so that the threaded hole and the lock hole are concentrically positioned; and a screw having a predetermined length so that the inner and outer hanger members sandwich the rear cover of the display device when the rear cover of the display device is disposed therebetween, the screw being inserted through the first through hole of the outer hanger member and the second through hole of the rear cover and threaded into the threaded hole of the inner hanger to fixedly couple the rear cover between the inner and outer hanger members, the lock hole preventing a long screw longer than the predetermined length from being threaded into the display device by mating an inner peripheral face of the lock hole with a distal end of the long screw, a rear edge of the inner peripheral face of the lock hole being chamfered to form a tapered face;

a spacing from the inner hanger member to an interface line between the tapered face and the inner peripheral face having a length such that a distal end of the screw that is threaded into the threaded hole abuts the tapered face of the lock hole, and the length of the spacing being equal to or slightly less than a length between the inner hanger member and the distal end of the screw that is threaded into the threaded hole.

7. A wall hanger for hanging a display device on a wall, the wall hanger comprising:

a latching member configured to be attached to the wall;

an outer hanger member configured to be fixedly coupled to a rear side of a rear cover of the display device and latched to the latching member, the outer hanger member having a first through hole arranged to align with a second through hole of the rear cover;

an inner hanger member configured to be fixedly coupled to a front side of the rear cover of the display device, the inner hanger member including a threaded portion with a threaded hole and a lock portion with a lock hole, the lock portion being integrally formed with the threaded portion and bent to face the threaded portion with a predetermined space therebetween so that the threaded hole and the lock hole are concentrically positioned; and a screw having a predetermined length so that the inner and outer hanger members sandwich the rear cover of the display device when the rear cover of the display device is disposed therebetween, the screw being inserted through the first through hole of the outer hanger member and the second through hole of the rear cover and threaded into the threaded hole of the inner hanger to fixedly couple the rear cover between the inner and outer hanger members, the lock hole preventing a long screw longer than the predetermined length from being threaded into the display device by mating an inner peripheral face of the lock hole with a distal end of the long screw, an inside diameter of the lock hole being smaller than a major diameter of the screw, but larger than a minor diameter of the screw, a rear edge of the inner peripheral face of the lock hole being chamfered to form a tapered face, and a spacing from the inner hanger member to an interface line between the tapered face and the inner peripheral face having a length such that a distal end of the screw that is threaded into the threaded hole abuts the tapered face of the lock hole.

8. The wall hanger according to claim 7, wherein the length of the spacing is equal to or slightly less than a length between the inner hanger member and the distal end of the screw that is threaded into the threaded hole.

* * * * *